United States Patent [19]

Pickermann

[11] 4,276,093
[45] Jun. 30, 1981

[54] ASPHALT PRODUCTION

[76] Inventor: Otto Pickermann, 723 Ferntree Gully Rd., Glen Waverley, Victoria, Australia

[21] Appl. No.: 938,482

[22] Filed: Aug. 31, 1978

[30] Foreign Application Priority Data

Sep. 2, 1977 [AU] Australia .................. PD1482/77

[51] Int. Cl.³ .................................................. C08L 95/00
[52] U.S. Cl. .................................... 106/281 R; 404/95
[58] Field of Search ........................ 366/24; 106/281; 404/95

[56] References Cited

U.S. PATENT DOCUMENTS 3,372,626  3/1968  Smarzak .................................. 404/95
3,625,121  12/1971  Huniback .............................. 404/95

Primary Examiner—Theodore Morris
Attorney, Agent, or Firm—Andrus, Sceales, Starke & Sawall

[57] ABSTRACT

Methods of manufacturing and re-processing asphalt in which bitumen for the asphalt is heated by use of a microwave oven. Re-processed asphalt is recycled in a microwave oven in a closed vessel.

9 Claims, 1 Drawing Figure

ASPHALT PRODUCTION

BACKGROUND OF THE INVENTION (i) Field of the Invention

This invention relates to asphalt production and particularly but not exclusively to production of asphalt used in road making.

(ii) Prior Art

Asphalt making apparatus usually includes a conveyor system, transporting mineral ore aggregate from cold feed bins to a dryer, where it is preheated. The dryer is usually of the rotatable drum type fitted with lifters to ensure good contact with the burner combustion gases. A conveyor system transports the preheated mineral ore aggregate from the dryer to a vibrating screen, which screen separates the preheated aggregate into various fractions and deposits the different fractions into hot bins. A mineral filler system discharges specified weights of mineral ore aggregate from the hot bins into a pug-mill mixer or similar mixing device, and after a specified dry mixing time, a predetermined weight or volume of bitumen is discharged into the pug-mill, the added bitumen being held in electrically heated storage bins prior to discharge into the pug-mill. The pug-mill then wet mixes preheated mineral ore aggregate and bitumen until a uniform mixture is obtained, and the resultant asphalt is then discharged into trucks and transported to the road-making site. Asphalt produced in this way is known as "hot mix".

One reason for producing "hot mix" in factories remote from the road-making site is that bitumen is an inflammable material and careful control must be maintained over heating of the bitumen to maintain the bitumen in a stable state. The required control would be more difficult to achieve if the "hot mix" was produced on site. Also, the equipment needed to produce the "hot mix" is not easily transportable and therefore moving the equipment from site to site is difficult and inefficient.

The burners used in the described drum type dryers usually operate on diesel fuel oil, or in some cases on heavy furnace oil, and are fitted with an exhaust fan to remove combustion gases and provide suction for secondary air to the burner. A duct positioned prior to the fan is fitted with a separator to effect dust removal, the dust being discharged as waste. Where the factory is located in built-up areas, pollution controls are necessary to limit the amount of dust discharged into the atmosphere to within "clean air" regulations.

SUMMARY OF THE INVENTION

In accordance with the invention asphalt is produced by a process including heating the aggregate in a microwave heater. More particularly, the invention envisages a process comprising heating the aggregate in a microwave heater, and then mixing the so heated aggregate with heated bitumen to produce asphalt. It would, however, also be possible to produce asphalt by heating aggregate and bitumen together. The invention also provides asphalt production apparatus comprising means for heating aggregate and bitumen, and means operable to mix the aggregate and bitumen the means for heating at least the aggregate including a microwave heater.

Aside from reducing the difficulties associated with the use of the customary drum type dryers, the microwave heaters render practical the production of hot mix asphalt on site, since the microwave heaters are relatively compact and relatively easily transportable. In such as case, much of the wastage presently associated with asphalt road making may be avoided.

Also, it is envisaged that "hot mix" asphalt produced using conventional processes or by a process according to the invention may be poured and sealed into containers of suitable shape and construction. When asphalt is required, the containers may be transported to the road-making site, whereat subsequent reheating of the containers in microwave heaters will render the asphalt suitable for use in road making. An advantage of this process is that "hot mix" asphalt may be stored in a solid state and reheated in microwave heaters positioned on-site.

In another aspect the invention provides a method of making asphalt wherein aggregate and bitumen are heated in one or more substantially closed vessels separately prior to mixing and/or together during mixing. In a still further aspect the invention provides a method of making asphalt in which aggregate is heated in a substantially closed vessels and then mixed with heated bitumen. The invention makes possible the re-cycling of used asphalt by simply re-heating such used asphalt in a closed vessel using a microwave heater. In the past, the heating has not been possible using conventional techniques.

Dielectric heating is the term applied to the generation of heat in non-conducting materials by their energy losses when subjected to an alternating high frequency electric field. The basic principle is that the material to be heated is placed between two capacitor plates across which a high frequency alternating voltage is impressed.

The term microwave heater conventionally refers to directly heating non-conducting materials using dielectric heating; however, the term has also come to include heaters which operate as a combination of both dielectric and induction heaters and it is in this extended sense that the term is used in the present specification.

BRIEF DESCRIPTION OF THE ACCOMPANYING DRAWING

The invention is further described with reference to the accompanying drawing in which:

FIG. 1 is a block layout of an asphalt factory incorporating the present invention.

DETAILED DESCRIPTION

Figure 1:
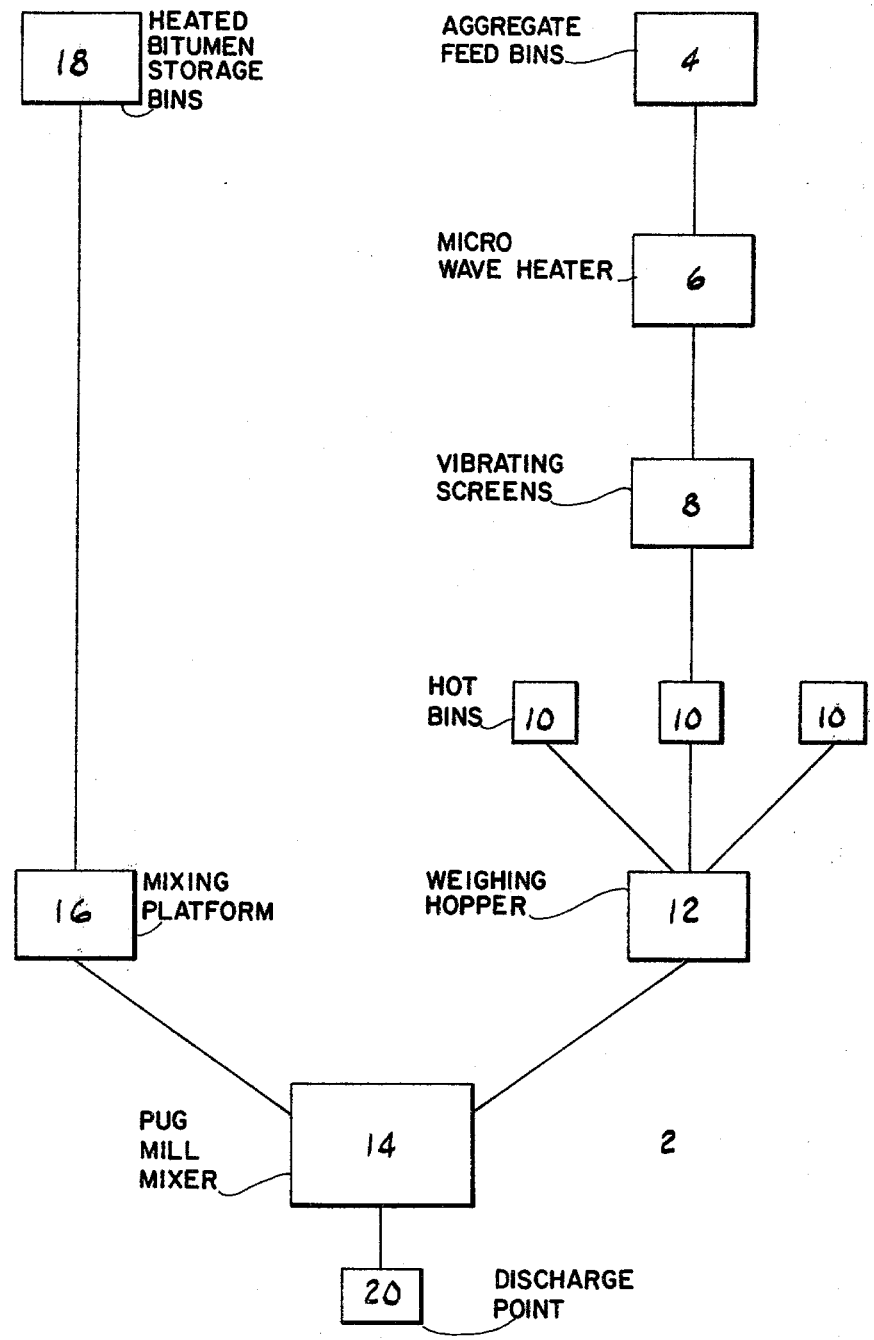

In the factory represented by FIG. 1 mineral ore aggregate is transported on conveyor belts from feed bins 4 to a microwave heater 6. When the temperature of the aggregate in the heater reaches the temperature range 300°–400° F., the heated mineral ore aggregate is discharged into a vertical elevator which conveys the aggregate to a vibrating screen 8, which separates the aggregate into various size functions and deposits these into hot bins 10. The exact temperature the aggregate is heated to in the microwave heater 6 is dependent on the mix type and the factory temperature loss during transport from the microwave heater outlet to a plug-mill mixer referred to later, the pug-mill mixer 14.

After leaving the heater, dry mixing is carried out. This comprises weighing out the appropriate quantity of mineral ore aggregate from each hot bin 10, (specified for a particular mix) cumulatively into a weighing hopper 12. The batch of mineral ore aggregate so weighed out is then discharged into pug-mill mixer 14 and dry mixed for a specified time. Pug-mill mixer 14 may be of conventional form being twin shafted and fitted with replaceable mixing tips and liner plates to ensure close tolerances between mixer tips and the body of the mill. Bitumen is stored in heated storage bins 18, in the conventional manner being, for example, electrically heated or, where high asphalt throughput justifies higher initial capital outlay, by use of hot oil heating. Bitumen is pumped from the heated storage bins 18 to a mixing platform 16 and a specified weight or volume is introduced from the mixing platform 16 into pug-mill 14 after completion of the mineral ore aggregate dry mixing. After introduction of bitumen into pug-mill mixer 14, wet mixing begins and continues until a uniform mixture of asphalt is obtained—the wet mixing cycle taking normally 45–80 seconds. The asphalt is then discharged into trucks at a discharge point 20 and transported to the road-making site.

Aside from manufacture of asphalt by the described process already processed asphalt may be re-processed by heating it in a substantially closed vessel by using a microwave heater. Samples of asphalt that have been layed for some time and dug up and recycled in this manner may well be quite satisfactory when so re-used.

It will be appreciated that heating by microwave apparatus will result in consumption of a considerable quantity of electricity in the production of the asphalt. However, additional running costs incurred this way can to some measure be offset by the substantial decrease in electric power consumed by ancillary equipment normally used in an asphalt plant. More particularly, conventional plants making use of drum dryers for heating the aggregate will normally require a substantial electric motor to rotate the drum in which the aggregate is heated, an additional motor to provide an air blast for operation of the oil burner used in the drum dryer as well as a substantial motor to operate cyclone and other separators and dust extractors needed to remove dust generated because of the necessary agitation of the aggregate during heating. In a medium sized plant, motors operating these apparatuses may have a total power consumption of the order of 350 kilowatts. Aside from this, the conventional dryers together with dust extractors occupy a substantial area of plant which need not be provided by use of the invention. These apparatuses are also costly and even with proper dust and combustion products extraction, conventional plants still create very substantial environmental problems.

As well as the use of a microwave heater to heat the aggregate and/or mixed bitumen, a microwave heater could be employed to maintain the bitumen in the heated condition prior to mixing. This heating is customarily effected with a heater which heats a suitable heat exchange fluid such as oil which is circulated around a tank containing bitumen. The use of a microwave heater either to heat the bitumen directly or indirectly by such a heat exchange fluid would result in substantial advantages, particularly, the heating could be effected in a substantially closed vessel so that generation of fumes would be minimized.

Whilst in the described plant, heating of the aggregate is effected directly by a microwave heater, the aggregate could be heated by a heat exchanger having fluid therein heated by a microwave heater.

The described construction has been advanced merely by way of explanation and many modifications may be made thereto without departing from the spirit and scope of the invention as defined in the appended claims.

I claim:

1. A process for forming asphalt comprising mixing aggregate and bitumen, the aggregate and bitumen being heated separately prior to the mixing and/or being heated during mixing; at least the aggregate being heated by use of a microwave heater.

2. A process for forming asphalt as claimed in claim 1 wherein said heating of the aggregate and bitumen is effected prior to mixing by the use of said microwave heater.

3. A process for forming asphalt as claimed in claim 1 wherein the aggregate and bitumen are heated together by said microwave heater and mixed.

4. A process for forming asphalt as claimed in claims 1, 2, or 3 wherein said heating with said microwave heater is effected substantially in one or more closed vessels.

5. A process for forming asphalt as claimed in any one of claims 1, 2, or 3 wherein said aggregate is heated on a conveyor arranged to pass the aggregate thereon past said heater.

6. A process for forming asphalt as claimed in claim 1 wherein the aggregate and the bitumen are placed in a substantially closed vessel and heated and mixed therein by use of said microwave heater.

7. A process for forming asphalt as claimed in claim 1 wherein the aggregate and bitumen are obtained by re-processing asphalt and wherein the process includes the steps of placing the asphalt to be re-processed in a substantially closed vessel and heating it by the use of a microwave heater.

8. A method for forming asphalt as claimed in claim 1 wherein aggregate and bitumen are heated in one or more substantially closed vessels separately prior to mixing and/or together during mixing.

9. A method for forming asphalt as claimed in claim 1 wherein aggregate is heated in a substantially closed vessel and then mixed with heated bitumen.

* * * * *